United States Patent [19]
Schmidt et al.

[11] Patent Number: 5,410,723
[45] Date of Patent: Apr. 25, 1995

[54] WAVEFRONT ARRAY PROCESSOR FOR BLOCKING THE ISSUANCE OF FIRST HANDSHAKE SIGNAL (REQ) BY THE PRESENCE OF SECOND HANDSHAKE SIGNAL (ACK) WHICH INDICATES THE READYNESS OF THE RECEIVING CELL

[75] Inventors: Ulrich Schmidt, Freiburg; Knut Caesar, Gundelfingen, both of Germany

[73] Assignee: Deutsche ITT Industries GmbH, Freiburg, Germany

[21] Appl. No.: 64,781

[22] Filed: May 21, 1993

Related U.S. Application Data

[63] Continuation of Ser. No. 608,914, Nov. 5, 1990, abandoned.

[30] Foreign Application Priority Data

Nov. 21, 1989 [EP] European Pat. Off. .......... 89121506

[51] Int. Cl.$^6$ .............. G06F 3/00; G06F 13/12; G06F 13/14; G06F 13/38
[52] U.S. Cl. .................. 395/800; 395/200; 364/229.5; 364/231.9; 364/240.9; 364/264.6; 364/926.1; 364/937; 364/940.61; 364/940.63; 364/940.67; 364/940.68; 364/940.81; 364/950.1; 364/DIG. 2
[58] Field of Search .............. 395/800, 500, 250, 325, 395/375, 800, 200, 250; 364/DIG. 1, DIG. 2

[56] References Cited

U.S. PATENT DOCUMENTS

| | | | |
|---|---|---|---|
| 4,298,936 | 11/1981 | Shapiro | 395/800 |
| 4,365,292 | 12/1982 | Barnes et al. | 395/800 |
| 4,663,706 | 5/1987 | Allen et al. | 395/200 |
| 4,720,780 | 1/1988 | Dolecek | 395/800 |
| 4,888,739 | 12/1989 | Frederick et al. | 365/221 |
| 4,891,787 | 1/1990 | Gifford | 395/375 |
| 4,896,265 | 1/1990 | Fiduccia et al. | 395/650 |
| 4,922,418 | 5/1990 | Dolecek | 395/575 |
| 4,985,832 | 1/1991 | Grondalski | 395/800 |
| 5,014,189 | 5/1991 | Tamitani | 395/800 |
| 5,058,001 | 10/1991 | Li | 395/500 |
| 5,081,701 | 1/1992 | Silver | 395/325 |
| 5,095,527 | 3/1992 | Uramoto et al. | 395/800 |
| 5,280,584 | 1/1994 | Caesar et al. | 395/250 |
| 5,305,462 | 4/1994 | Grondalski | 395/800 |

FOREIGN PATENT DOCUMENTS 0277262 3/1987 European Pat. Off. .

OTHER PUBLICATIONS

Proceedings Of The IEEE International Conference On Computer Design: VLSI In Computers, Oct. 1985, pp. 612–616, "An Interconnection Scheme for a Tightly Coupled Massively Parallel Computer Network", J. C. Harris, et al.

(List continued on next page.)

*Primary Examiner*—Alyssa H. Bowler
*Assistant Examiner*—Meng-Ai T. An
*Attorney, Agent, or Firm*—Thomas L. Peterson

[57] ABSTRACT

A wavefront array processor where each cell includes a handshake port for asynchronous data transfer with an adjacent cell. The handshake port includes a buffer for receiving data from the adjacent cell and a latch for transferring data to the adjacent cell. Data transfer is accomplished through use of a handshaking protocol which indicates whether or not a receiving buffer is full and if the buffer can receive data. Data can only be transferred if there is room in the buffer to accept the data. The handshaking protocol responds to status signals. A source status signal indicates that a data source has generated a data word. A sink status signal indicates that the buffer can receive data. Each cell further includes a data processing unit, which provides the latch with data and which accesses data from the buffer, and a blocking device, which allows the data processing unit or another handshake port to transfer data to the latch and the buffer to accept data, only when the handshake signals are appropriate. Internal to each cell is a ring bus configuration for distribution of data between the handshake ports and the data processing unit.

24 Claims, 5 Drawing Sheets

OTHER PUBLICATIONS

Computer, Book 20, No. 7, Jul. 1987, pp. 102–103; I. Koren: "The Concept and Implementation of Data-Driven Processor Arrays".

Proceedings Of The International Conference On Systolic Arrays, May 25–27, 1988, pp. 611–620, IEEE, H. Ueda, et al.:"AMultiprocessor System Utilizing Enhanced DSP's for Image Processing".

ICASSP'86, Proceedings Of The International Conference On Acoustics, Speech, And Signal Processing, Apr. 7–11, 1986; Book 4, pp. 2891–2894, IEEE, D. A. Schwartz, et al.: "The Optimal Synchronous Cyclo-Static Array: A Multiprocessor Supercomputer for Digitial Signal Processing".

IEEE Transactions On Computers, Book C-34, No. 8, Aug. 1985, pp. 734–740, IEEE, A. L. Fisher, et al.: "Synchronizing Large VLSI Processor Arrays".

IEEE Computer, vol. 20, No. 7, Jul., 1987; S. Y. Kung, et al. "Wavefront Array Processors–Concept to Implementation", pp. 18–33.

Proceedings Of The IEEE International Conference ONF Acoustics, Speech And Signal Processing, 1989, pp. 2476–2479; "A Programmable Video Signal Processor".

IEEE Transactions On Computers, vol. C-36; No. 12, Dec., 1987; pp. 1523–1538; "The Warp Computer: Architecture, Implementation, and Performance" by Marco Annaratone, et al.

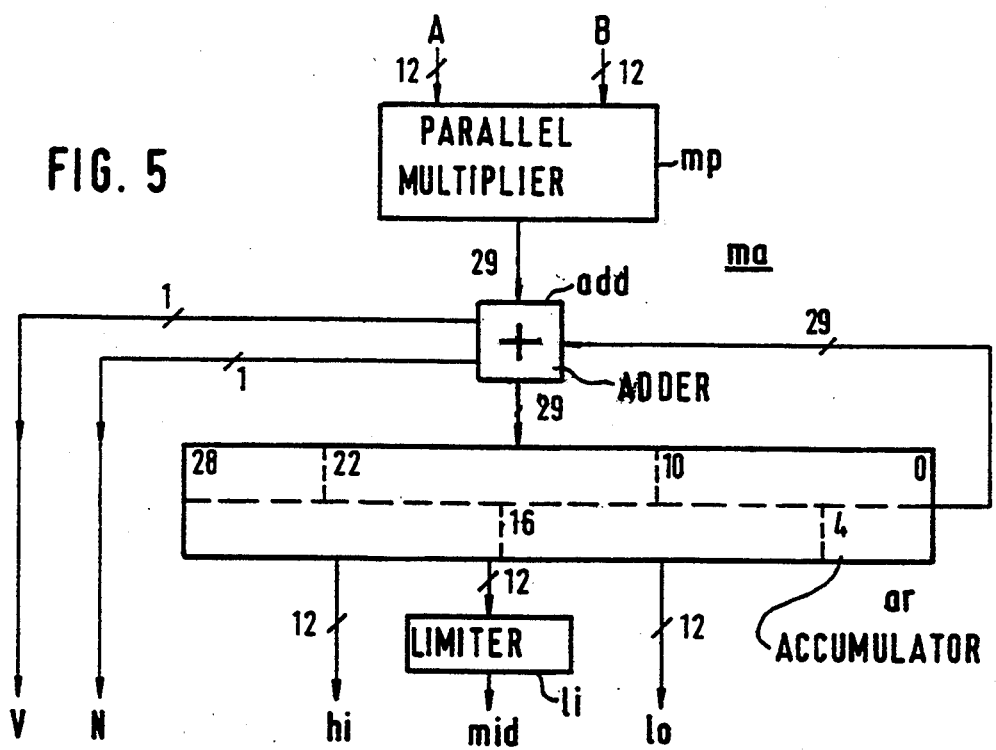
FIG. 5
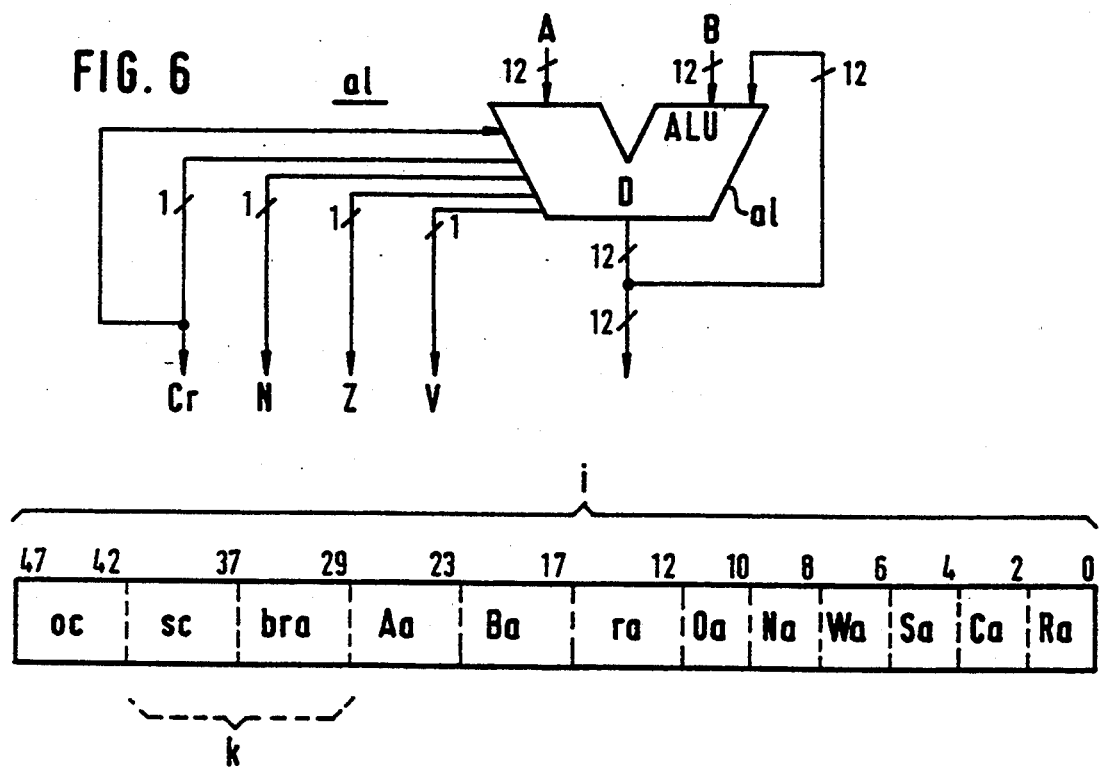
FIG. 6
FIG. 7

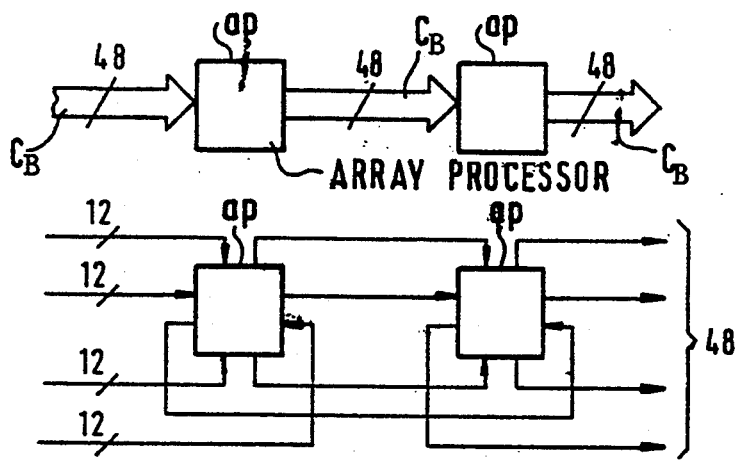
FIG. 8a
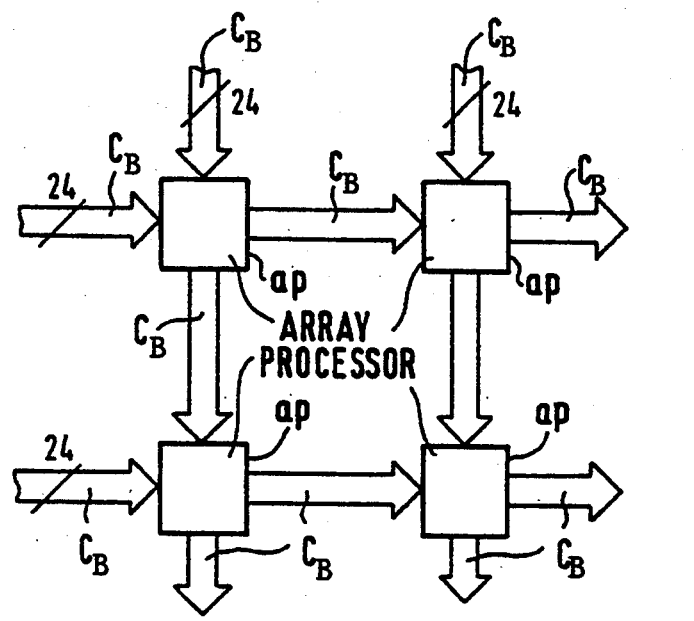
FIG. 8b
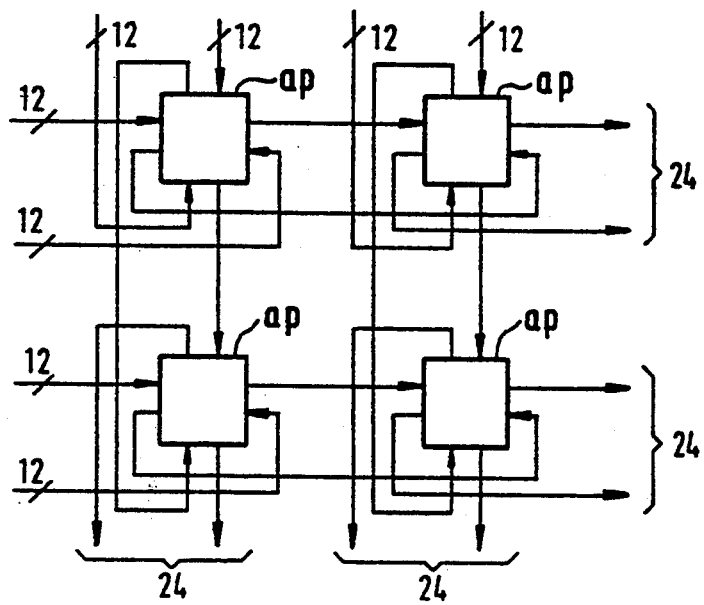

WAVEFRONT ARRAY PROCESSOR FOR BLOCKING THE ISSUANCE OF FIRST HANDSHAKE SIGNAL (REQ) BY THE PRESENCE OF SECOND HANDSHAKE SIGNAL (ACK) WHICH INDICATES THE READYNESS OF THE RECEIVING CELL

This a continuation of application Ser. No. 07/608,914, filed Nov. 5, 1990, now abandoned.

BACKGROUND OF THE INVENTION

The present invention relates in general to array processors and in particular to array processors that are data driven.

Array processors are becoming increasingly desirable for the processing of digital signals, and especially for real-time processing of one-dimensional and multi-dimensional video signals. Appropriate sampling rates for video signals range from about 3 MHz for simple chrominance signals in a TV receiver to 108 MHz and higher for video signals in a high definition television receiver. In high-definition television with flicker-free picture reproduction, it is necessary to interpolate additional interlines from spatially and temporally adjacent picture lines. The spatial reference is defined by the raster-scanned picture plane, and the temporal reference by the picture sequence. A system for real-time processing of these video signals must contain processing elements that can perform these operations simultaneously and that can exchange data in an effective manner. Array processors permit such processing.

An array processor, which consists of a plurality of cells (processing elements) interconnected by data buses, can be classified as either a systolic array processor or a wavefront array processor. The systolic array processor rhythmically computes and passes data in accordance with a global timing-reference "beat." In contrast, the wavefront array processor is data driven. Whenever data is available, a transmitting cell informs a receiving cell to accept the data. A two-way communication scheme (handshaking protocol) between the transmitting and receiving cells ensures that the wavefronts propagate in an orderly manner instead of crashing into one another. Thus, cells in a wavefront array processor must be sequenced instead of timed. One advantage to asynchronous data transfer is that slower cells do not have to hold back faster cells.

Array processors are also classified as single-instruction, multiple-data-stream (SIMD) and multiple-instruction, multiple-data-stream (MIMD). In SIMD array processors, a single processing unit controls the cells. All cells receive the same instruction from the control unit, but operate on different data streams. In MIMD array processors, each cell has its own control unit, program and data. Each cell is individually programmable.

See an article entitled "A programmable video signal processor" by R. J. Sluyter, P. J. et al., in Proceedings of the IEEE International Conference on Acoustics, Speech and Signal Processing, 1989, pages 2476 to 2479. An MIMD array processor adapted for video signal processing has a triangular topology and uses clock-controlled inter-cell communication to process the video signals in real time. Each module consists of five processing elements: three for arithmetic and logic operations and two for memory operations. The elements operate in parallel and are interconnected by a crossbar switch. Each processing element is controlled by a "cyclostatic" program, which is cyclically repeated without break. Thus, there is no branching. All operations are synchronous with a processor clock, whose frequency is a multiple of the sampling frequency.

The architecture of an SIMD wavefront array processor is described in an article entitled "Wavefront Array Processors - Concept to Implementation" by S. Y. Kung, S. C. Co, S. N. Jean and J. N. Hwang in "Computer", Vol. 20, No. 7, July 1987, pages 18 to 33. Each cell communicates with adjacent cells. Asynchronous data transfer between two cells is accomplished by a handshaking protocol in which the data sources and data sinks are buffered by queues, which can be First-In-First-Out (FIFO) memories. For each direction of data flow, one FIFO memory is provided in the data path of two adjacent cells. The handshaking protocol is usually implemented in one clock period.

European Patent Application EP-A O 277 262 discloses an array processor having a plurality of identical cells in a two-dimensional (mesh) array. Thus, each cell can communicate with four adjacent cells via four communication buses. Data transfer is asynchronous from cell to cell. Each cell contains a data memory, an arithmetic logic unit and a shift register.

In an article entitled "The Concept and Implementation of Data-Driven Processor Arrays" by Israel Koren and Irit Peled in Computer, Vol. 20, No. 7, July 1987, on pages 102 to 103 there is described a data-driven MIMD array processor having 50–100 cells that are integrated on a chip using Very Large-Scale Integration (VLSI) technology. The array has a two-dimensional hexagonal structure that allows each cell to exchange data with six adjacent cells via an internal ring-bus system. A cell executes an instruction upon the arrival of all operands required for that instruction. Several global buses within the array processor ensure that each cell can communicate directly with an external host computer.

A one-dimensional systolic MIMD array processor is described in an article entitled "The Warp Computer: Architecture, Implementation, and Performance", by Marco Annaratone et al., in IEEE Transactions on Computers, Vol. C-36, No. 12, December 1987, pages 1523 to 1538. Communication between the individual modules takes place via a queue having a depth of 512 words, sufficient to buffer a scan line of an image. The queue is implemented by a FIFO chip. Flow control for the communication channels is implemented in hardware. When a queue (FIFO) is full or empty, the sender or receiver, respectively, is blocked until the data traffic can be handled by the queue. Thus, when a cell tries to read from an empty queue, it is blocked until a data item arrives. Similarly, when a cell tries to write to a full queue of an adjacent cell, the writing cell is blocked until some data are removed from the full queue. The blocking of the cell is transparent to the program that controls the cell. Two clock generators are required: one for the computational units whose states freeze whenever a cell is blocked, and one for the queues. Latching of data into the queue is controlled by the sender, rather than the receiver. As a cell sends data to an adjacent cell, it also signals the receiving cell's input to accept the data. There is no handshaking between adjacent cells.

SUMMARY OF THE INVENTION

The present invention relates to a wavefront array processor that has a plurality of cells that are interconnected by a network having a regular topology. Each one of the cells comprises communication means for transferring data over the network to and from an adjacent cell. The communication means includes handshaking means for exchanging handshaking signals with the adjacent cell, transmitting means, responsive to the handshaking means, for transmitting the data to the adjacent cell over the network, and receiving means for receiving and buffering data transmitted over the network by the adjacent cell. The receiving means provides a first signal, which indicates that the receiving means is not buffering any data. Each cell further comprises data processing means for processing the data, which data processing means provides the transmitting means with the data and which accesses the data from the receiving means; and first blocking means, responsive to the first signal provided by the receiving means, for blocking the data processing means from accessing the data from the receiving means.

BRIEF DESCRIPTION OF THE DRAWINGS

FIG. 2 is a block diagram of the cell, which is illustrated in FIG. 1a;

FIG. 5 is a block diagram of an accumulating multiplier which forms a part of the cell illustrated in FIG. 2;

FIG. 6 is a block diagram of an arithmetic/logic unit which forms a part of the cell illustrated in FIG. 2;

FIG. 7 is a schematic diagram of the format of an instruction set to be entered as a program step; and FIG. 8a is a schematic diagram of through-switching of exceptionally wide data streams for an array processor that is interconnected linearly.

FIG. 8b is a schematic diagram of through-switching of exceptionally wide data streams for an array processor that is interconnected in a planar manner.

DETAILED DESCRIPTION OF THE FIGURES

Figure 1:
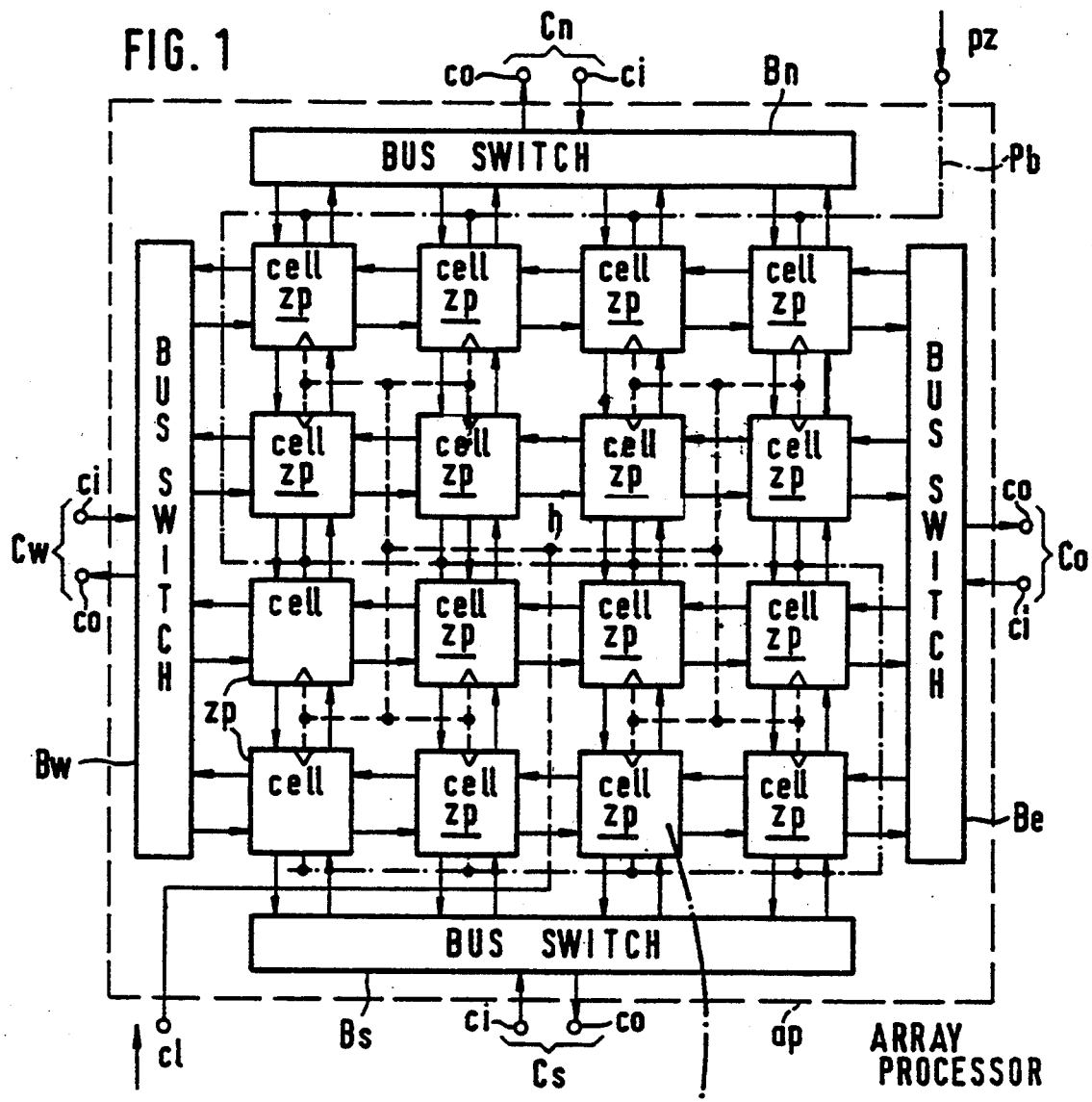
FIG. 1 is a block diagram of an embodiment of an array processor in accordance with the present invention.
Figure 1A:
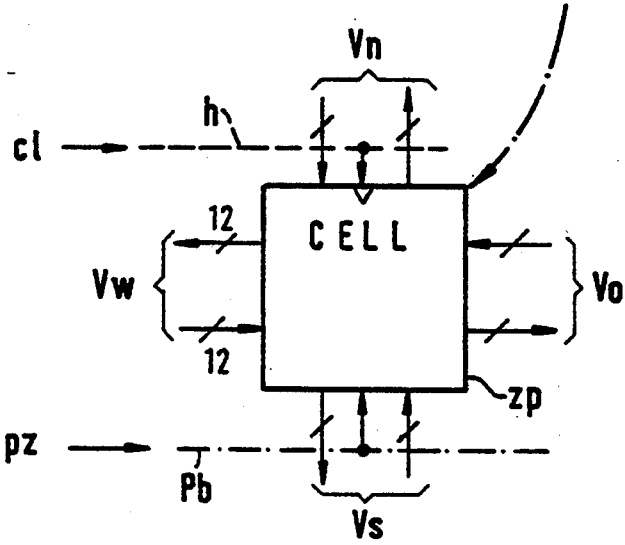
FIG. 1a is an enlarged view of a cell, which forms a part of the array processor illustrated in FIG. 1.

Referring now to FIGS. 1 and 1a, an array processor ap contains a square array of sixteen cells zp, which are integrated on a single chip. The individual cells zp can alternately be arranged in any rectangular structure or even in a one-dimensional (i.e., linear) structure. The number of cells zp is limited only by the integration technology used. Each cell zp has four communication buses Vw, Vs, Ve and Vn, each of which connects a cell zp to an adjacent cell zp or, in the case of the outer cells zp, to one of four bus switches Bw, Bs, Be and Bn. Each bus switch Bw, Bs, Be and Bn, which functions as an electronic multiwafer multiposition switch, has input and output terminals ci and co, respectively. If, for example, each communication bus Vw, Vs, Ve and Vn has twelve bits for data input and twelve bits for data output, each bus switch Bw, Bs, Be and Bn will have twelve external output terminals co for data output and twelve external input terminals ci for data input. In each switch position, all data-input and data-output bits of the communication buses Vw, Vs, Ve and Vn are connected to an equal bit number of external input and output terminals ci, co. In addition, status signals assigned to each communication bus Vw, Vs, Ve and Vn, which serve to implement the handshaking process, are routed through the bus switches bs. External communication buses Cw, Cs, Ce and Cn are coupled to the input and output terminals ci and co of bus switches Bw, Bs, Be and Bn, respectively.

A clock signal cl for the sixteen cells zp is applied to branched clock lines h, which are shown in dash. The real-time signal processing in the array processor ap requires a high clock rate, especially if high-definition television (HDTV) signals are to be processed. To permit a clock signal of, for example, 125 MHz to be simultaneously distributed to the cells zp, careful routing of the clock lines is necessary; otherwise, the phase difference between the clock signals of the individual cells zp will become too large. An advantageous scheme for the distribution of the clock signal cl is the so-called H tree, which ensures that the branched clock lines h are uniformly loaded up to their end points, and that the clock signal cl is supplied to each cell over the same line length. Such an arrangement is described in an article entitled "Synchronizing Large VLSI Processor Arrays" by Alan L. Fisher and H. T. Kung in IEEE Transactions on Computers, Vol. C-34, No. 8, August 1985, pages 734 to 740, especially page 737.

A programming bus Pb, to which all cells zp are connected, is shown as a dash-and-dot line. A cell program pz, which is applied to programming bus pb, reaches each cell zp via individual addresses. In the case of an application program, the cell program pz usually remains constant or is seldom modified; therefore, a serial programming bus Pb is quite sufficient.

Referring now to FIGS. 8a and 8b, there are shown schematic representations of the through-switching of data streams for array processors ap that are interconnected by external communication buses $C_B$. The upper diagram of each figure shows the logic data path, while the lower diagram shows the associated physical interconnection of the external array input and output ports. Data transfer inside and outside the array processor ap is strictly parallel, so that a plurality of array processors ap can be inter-connected to form a larger array with strictly parallel data transfer. This makes it possible to solve complex problems in areas such as video signal processing, image processing, graphics, or multidimensional filtering. If the array processors ap are connected in series in a linear fashion (see FIG. 8a), a linear data transfer of up to forty-eight bits can be achieved. If the array processors ap are connected in series in a planar fashion (see FIG. 8b), a data transfer of up to twenty-four bits in two independent directions can be achieved. This applies to the example assumed above in which the communication bus $C_B$ has twelve input bits and twelve output bits. Thus, an extremely efficient transfer device is made available to the user.

Figure 2:
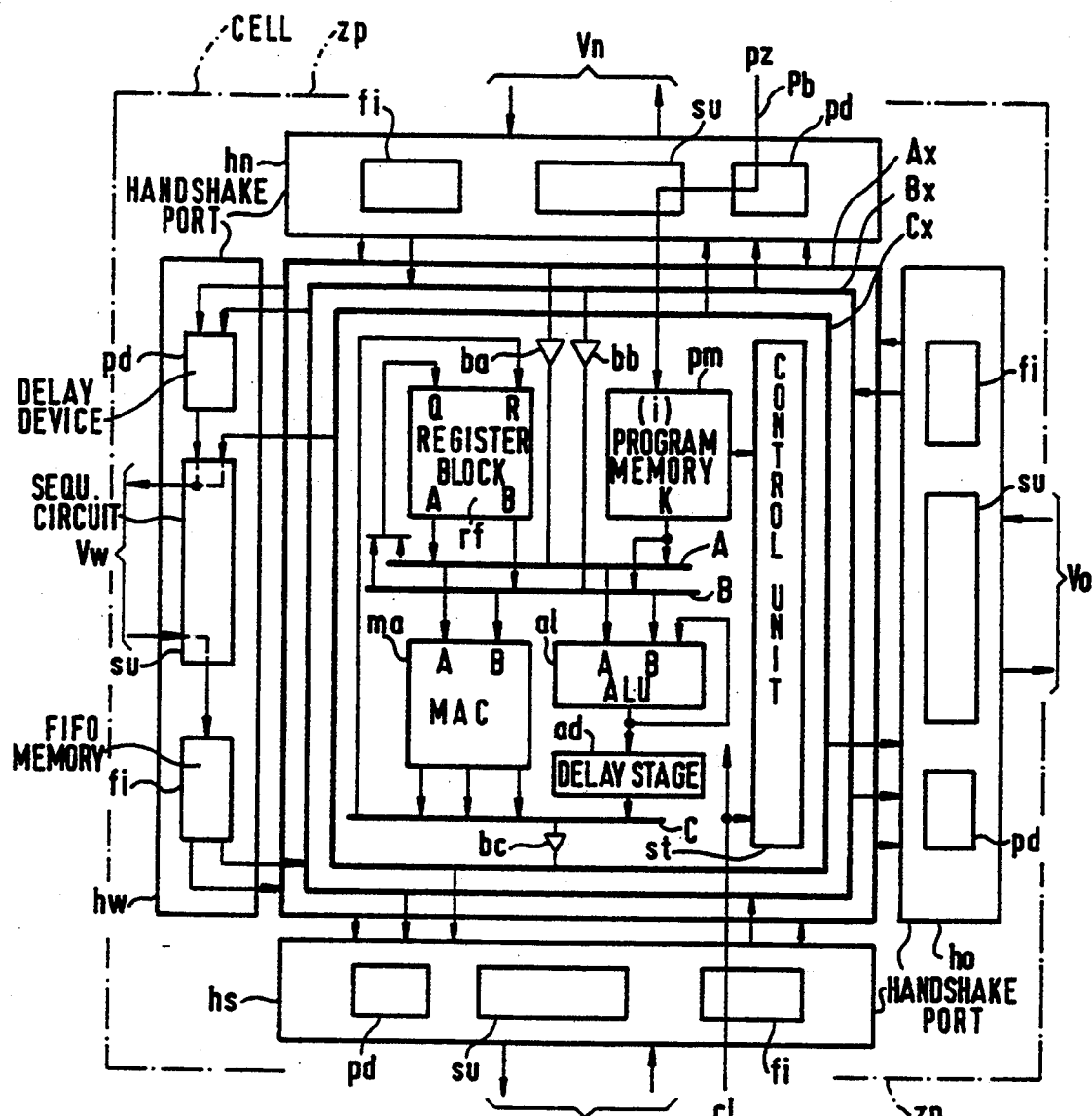

Referring now to FIG. 2, there is shown a block diagram of a single cell zp. For the sake of clarity, FIG. 2 shows only the data links, which are usually implemented as multibit buses, while the control lines are not illustrated. Data processing is performed in the nucleus of the cell zp. The nucleus includes an accumulating multiplier (MAC) ma and an arithmetic logic unit (ALU) al, which also performs shifting and rotation functions. A nucleus-bus system for internal data processing purposes consists of a first source bus A, a second source bus B, and a result bus C. A- and B-inputs of the accumulating multiplier ma are coupled to the first and second source buses A and B, respectively, and the output end is coupled to the result bus C. A- and B-inputs of the arithmetic logic unit al are connected to the first and second source buses A and B, respectively, and its output is connected to the result bus C. The pipeline depth of the accumulating multiplier ma is greater than the pipeline depth of the arithmetic logic unit al. Therefore, the propagation delay of the accumulating multiplier is greater than that of the arithmetic logic unit. To equalize the propagation delay times, a delay stage ad is connected between the output of the arithmetic logic unit al and the result bus C. For operations which are dependent upon the result of the previous operation (i.e., "concatenated" operations), the output of the ALU al is fed directly back to one of the inputs of the arithmetic logic unit al, which in FIG. 2 is the B-input. By this direct feedback path, the latency of the ALU delay stage ad is minimized.

Fast data buffering takes place in a register block rf, which has sixteen selectively accessible register cells. The register block rf is adapted to a three-address processing of the cell zp, which combines two operands and stores a result for each period of the clock cl. The R-input of the register block rf receives the contents of the result bus C, while the Q-input is fed either from the first or second source bus A or B. The A- and B-outputs of the register block rf are connected to the first and second source buses A and B, respectively. For fast access, the register block rf can store the contents of the A-output or B-output into the Q-input by simultaneously writing the A-output or B-output onto the A or B sources bus and then reading into the Q-input.

Instruction sets i, which constitute the cell program pz, are stored in a program memory pm, may also include constants k, which are outputted via an output K to either the first source bus A or the second source bus B. The operation of the cell zp is controlled by a control unit st in accordance with the instruction sets i stored in the program memory pm.

The nucleus of the cell zp is surrounded by a ring-bus system, which consists of a first ring bus Ax, a second ring bus Bx, and a third ring bus Cx, each of which is a twelve-bit bus. The first and second source buses A and B are coupled to the first and second ring buses Ax and Bx, respectively, via A-bus and B-bus registers ba and bb, respectively. Similarly, the result bus C is coupled to the third ring bus Cx via a C-bus register bc. These bus registers ba, bb and bc function to decouple the nucleus-bus system from the ring-bus system. In addition, each bus register ba, bb and bc stores a data word until overwritten with a new data word. Thus, the data words read from handshake ports hw, hs, he and hn are temporarily stored in the bus registers ba and bb, and therefore are usable by the data processing circuits of the cell nucleus until they are overwritten.

The handshake ports hw, hs, he and hn, which are bidirectional data transfer devices, are located at respective sides of the cell zp. Each handshake port hw, hs, he and hn has three twelve-bit data inputs for the first, second and third ring buses Ax, Bx and Cx, respectively, and two twelve-bit data outputs for the first and second ring buses Ax and Bx, respectively. The handshake ports hw, hs, he and hn control the flow of data over their associated communication bus Vw, Vs, Vo, and Vn. The handshake ports hw, hs, he and hn of adjacent cells zp exchange control signals over control lines (not shown), which run parallel to the communication buses Vw, Vs, Ve and Vn. The handshaking process is implemented by means of a handshaking protocol.

Each handshake port hw, hs, he and hn includes a first-in-first-out (FIFO) memory fi, a delay device pd and a sequential circuit su. The data outputted by an adjacent cell zp is received by FIFO memory fi. Each handshake port hw, hs, he and hn is connected to the first and second ring buses Ax and Bx via the port delay device pd, which delays the data signals by a specified amount of time. The port delay device pd prevents the data from being transferred over the ring-bus system to a handshake port earlier than data which is first routed through the cell nucleus. In this manner, simultaneity of the externally accessible data is achieved, which is independent of the data processing in the cell nucleus. Data from the cell nucleus is placed on the result bus C, and thereafter transferred to the handshake ports hw, hs, he and hn via the third ring bus Cx. Since this data need not be delayed, it is transferred directly to the sequential circuit su in the handshake port. Implementing the handshaking protocol, the sequential circuit su transfers either the delayed data from the first or second ring bus Ax or Bx or the undelayed data from the third ring bus Cx over the communication bus Vw, Vs, Ve or Vn to an adjacent cell zp. The data to be received by the adjacent cell zp is transferred into the sequential circuit su over the appropriate communication bus Vw, Vs, Ve or Vn in accordance with the handshaking protocol and thereafter loaded into the FIFO memory fi for buffering. From there, the data is placed on either the first or second ring bus Ax or Bx of the adjacent cell, as described above.

Thus, the ring-bus system permits a very flexible data exchange between different handshake ports hw, hs, he and hn of a cell zp. It is possible, for example, to transfer three independent data streams over the first, second and third ring buses Ax, Bx and Cx, whereby the first and second ring buses Ax and Bx are fed from one handshake port each, while the result bus Cx feeds up to four handshake ports hw, hs, he and hn at a time.

Figure 3:
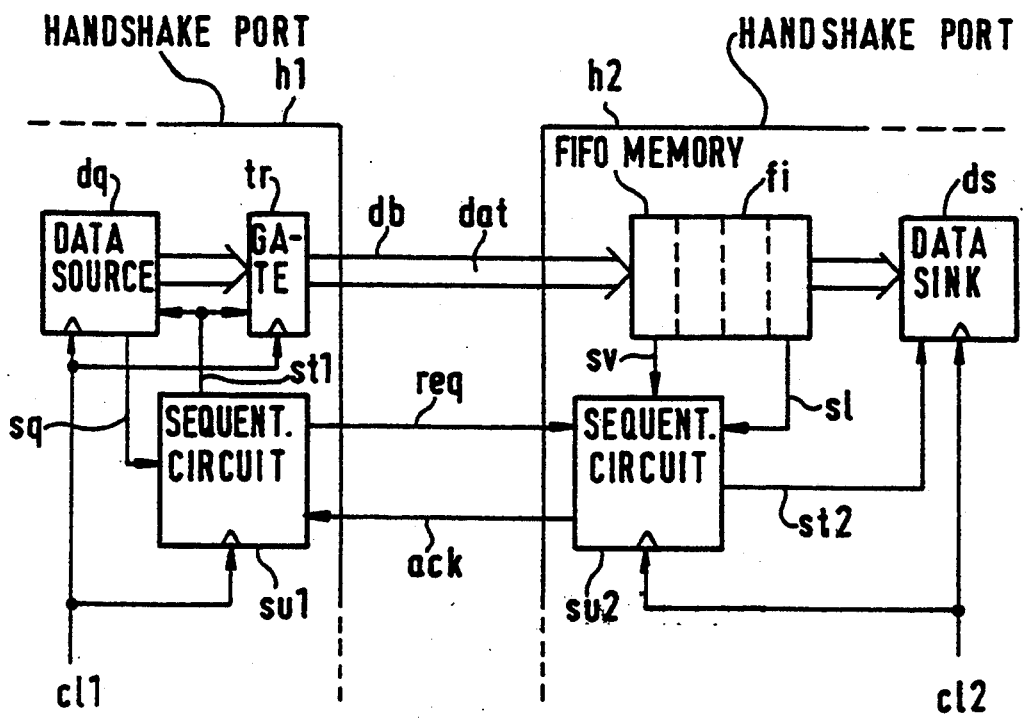
FIG. 3 is a block diagram of a portion of a bidirectional data transfer device.

Referring now to FIG. 3, there is shown portions of two handshake ports h1 and h2 for two adjacent cells zp1 and zp2. For the sake of clarity, only those portions of the handshake ports h1 and h2 are shown which are necessary for data transfer in one direction from one cell zp1 to the adjacent cell zp2. Thus, only the data transmitting portion is shown for the handshake port h1 of the transmitting cell zp1, and only the receiving portion is shown for the handshake port h2 of the receiving cell zp2. For bidirectional communication, each handshake port h1 and h2 contains both the data transmitting and receiving portions.

A gate tr, which must be thought of as forming the transmitting portion of the sequential circuit su1, receives a data word dat from a data source dq, which is clocked by a first clock signal cl1. The data source dq can be either an element in the cell nucleus or another handshake port. Under the direction of the sequential circuit su1, the gate tr transfers the buffered data word dat over the data bus db to the FIFO memory fi of handshake port h2. The FIFO memory fi buffers the data word dat. Under direction from the sequential circuit su2, a data sink ds reads the data word from the FIFO memory fi. The data sink ds, which is controlled by a second clock signal cl2, can be either the nucleus of the receiving cell zp2 or another handshake port of the receiving cell zp2. The two clock signals cl1 and cl2 have the same frequency, but their phases may differ due to differential delays (see FIG. 4). The above-mentioned asynchronous handshaking protocol ensures correct data transfers even if the two clock signals cl1 and cl2 are delayed by different amounts of time or even differ in frequency.

Figure 4:
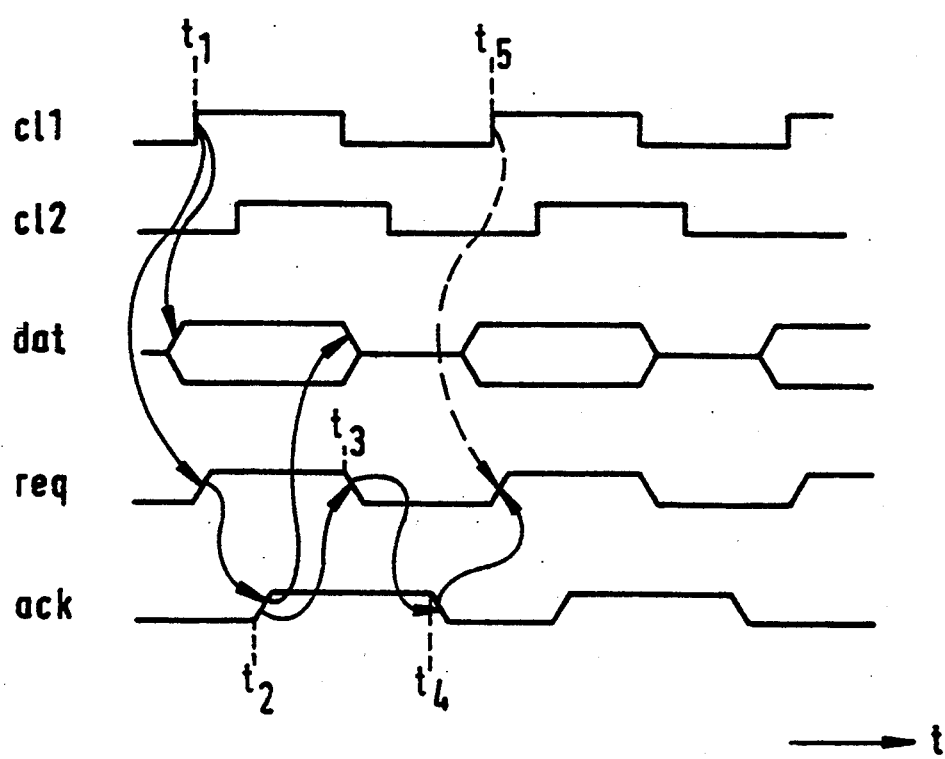
FIG. 4 is a timing diagram for the bidirectional data transfer illustrated in FIG. 3.

The handshake protocol will now be explained with the aid of the timing diagram shown in FIG. 4. For the cell zp1 to transfer data to the cell zp2, the data transmitting portion of sequential circuit su1 must issue a request signal req to the receiving portion of sequential circuit su2. This is shown at time t1. The data transmitting portion of sequential circuit su1 can issue the request signal only if an acknowledge signal ack is not being sent by the receiving portion of sequential circuit su2. If the acknowledge signal is not issued, then the data receiving portion of sequential circuit su2 is ready to receive a data word dat. Once the FIFO memory fi receives the data word dat, the receiving portion of sequential circuit su2 issues the acknowledge signal ack. This is shown at the time t2. The acknowledge signal ack is not transmitted until the data word dat has actually been accepted by the FIFO memory fi. The data word dat must have reached its stable state by the start of the request signal req.

The transmitting portion of the sequential circuit su1 acknowledges that the data word dat has been received by FIFO memory fi by lowering the request signal req. This is shown at time t3. At the same time, the data word dat may be cancelled. Once the receiving portion of sequential circuit su2 is ready to accept a new data word dat, i.e., at least one cell in the FIFO memory fi is free, it lowers the acknowledge signal ack. This is shown at time t4. Thus, the lowering of the acknowledge signal by the receiving portion of sequential circuit su2 is followed by the lowering of the request signal req by the transmitting portion of sequential circuit su1. A new data transfer can then be sent by the transmitting portion of sequential circuit su1 at the time t5 at the earliest.

Thus, the entire data transfer can be performed asynchronously within a single clock period. For data to be transferred within one clock period, all four phases of the handshaking protocol must be implemented within one clock period. This can be done either asynchronously or synchronously with any higher-frequency clock signals that may be present. Correct data transfer is achieved in many cases by locking the individual phases of the handshaking protocol.

The raising and lowering of the request and acknowledge signals are logically combined with status signals sq and sv provided by the data source sq and FIFO memory fi, respectively. The request signal req, for example, can be issued only when a status signal sq is sent from the data source dg to the transmitting portion of the sequential circuit su1. The source status signal sq indicates that the data source dq has generated a data word dat. Further, without the lowering of the acknowledge signal ack, the source sequential circuit su1 cannot issue the request signal re to initiate the transfer of a data word dat. For the receiving portion of the sequential circuit su2, the acknowledge signal ack is lowered only when a first sink status signal sv is sent from the FIFO memory fi to the sink sequential circuit su2. The sink status signal sv indicates that at least one cell in the FIFO memory fi is free.

It is apparent that a large FIFO memory fi permits a largely independent data exchange provided that the FIFO memory fi accepts as many data bits as are transmitted by the gate tr. If this is not the case, then data will be lost in the data source dq, or the data sink ds will read from empty cells of the FIFO memory fi. While this condition can be avoided in the program by inserting nop instructions, it requires precise monitoring of the run times of the individual signal paths in the array processor ap and makes the programming extremely difficult.

Therefore, according to a particularly advantageous aspect of the invention, the sequential circuits su1 and su2 automatically ensure that the FIFO memory fi accepts as many data bits as provided by the gate tr. Transfer of a data word dat is invisible to software and a programmer need not concern himself with the logic synchronization of the data transfer. For example, the data source dq and the gate tr are stopped (blocked) by a source stop signal st1, which is issued by the transmitting portion of sequential circuit su1, when the acknowledge signal ack indicates that the FIFO memory fi is not ready to receive. On the other hand, the data sink ds of the receiving cell zp2 is blocked by a sink stop signal st2, issued by the receiving portion of the sequential circuit su2, when a second status signal sl from the FIFO memory fi indicates that FIFO memory is empty. As long as a stop signal st1 or st2 is active, the state of the respective cell remains "frozen." In particular, the time relationships between the data are preserved. To freeze the state of a cell, an increased amount of circuitry in the cell is required. However, the added circuitry is warranted by the increased programming convenience.

Thus, the handshaking protocol disclosed herein allows for data to be transferred asynchronously from handshake port to handshake port. The temporal implementation of the handshaking protocol is highly variable in detail, such that even great differential delays that are beyond chip limits can be taken into account.

Referring now to FIG. 5, the accumulating multiplier ma includes a parallel multiplier mp, which uses pipelining, which has A- and B-inputs of 12 bits apiece and which generates a signed output of 29 bits. The output of the parallel multiplier mp is applied to one input of an adder add, whose other input is fed with the output signal from an accumulator ar. The adder add provides an overflow signal V, which indicates that the predetermined range of numbers is exceeded, and a sign signal N, which indicates that the output of the adder add is a negative number. The output of the adder add is applied to the input of the accumulator, which has a memory capacity of 29 bits. The five additional bits of the accumulator ar represent the maximum possible range of accumulation for the multiplication of two 12-bit numbers. In the two's complement representation, they also include the sign bit.

The contents of the accumulator ar can be placed on the result bus C as follows. Since the result bus C illustrated in FIG. 2 has a width of only twelve bits, twelve bits is the most that can be placed on this bus. One approach is to read out the high-order word (twelve most significant bits) of the accumulator ar and then read out the low-order word (the next twelve bits). The five least significant bits in the accumulator ar are not loaded onto the result bus C. A second approach is to read out twelve bits from a middle range mid, such as bits 11 to 22. Further processing of this middle range mid is appropriate if the result of the multiplication remains essentially within this range. This also applies to multiplications involving fixed-point operands in the range of values from −1 to +1. Any results in excess of the range mid, however, will not lead to a disturbing jump in the result even if this middle range mid is passed through a limiter li, which would hold the data value at the upper and lower limits of the range. The limiter would be operated by the control unit st.

Referring now to FIG. 6, the arithmetic logic unit al adds together its A- and B- inputs, which are each 12-bits, and which are provided by the first and second source buses A and B, respectively. The resulting twelve bit output D of the arithmetic logic unit al is fed back to a third input. This data feedback also allows for concatenated shifting and rotation functions to be performed, which functions include the carry signal if required. In addition to providing an output D, the arithmetic logic unit al provides the following status signals: an overflow signal V, which indicates an overflow, a sign signal N, which indicates a negative result, a zero signal Z, which indicates that the result equals zero, and a carry signal Cr. The carry signal Cr is also fed back to the arithmetic logic unit.

Referring now to FIG. 7, there is shown a single instruction contained in program memory pm. Each instruction consists of forty-eight bits, which are entered as a program step. A first field, bits 42–47, contains the op-code oc for the control unit st. A second field, bits 37–41, contains a condition code sc, which addresses status signals of the cell nucleus and of the handshake ports. A third field, bits 29–36, contains a branch address bra. If the condition code sc is satisfied by the status signals of the cell nucleus or its handshake port, then the control unit st fetches and executes the instruction stored at the branch address. In place the condition code sc and the branch address bra, bits 29–41 can hold a constant k, which is placed on the first or second source bus A or B via the output K of the program memory pm (see FIG. 2). In fourth and fifth fields, bits 23–28 and 17–22, source addresses Aa and Ba for the first and second ring buses Ax and Bx are defined. Delayed by one clock period, these addresses also apply for the nucleus-bus system. For this purpose, data sources include a handshake ports hw, hs, he and hn, register block rf, the arithmetic logic unit al, the output K of the program memory pm, and bus registers ba or bb.

The fourth and fifth fields are followed by fields 6–10 which determine the destination (sink addresses) of the data. In the sixth field, a first sink address ra indicates which one of the register cells in the register block rf must be loaded from the result bus C. The seventh, eighth, ninth, and tenth fields correspond to the handshake ports hw, hs, he and hn, respectively. The respective addresses Oa, Na, Wa and Sa at fields 7–10 contain two bits that indicate from which one of the three ring buses Ax, Bx or Cx the data originates or that indicate whether the handshake port is to remain "silent" and not transmit data. The latter condition corresponds to a nop (no operation) instruction. The eleventh field contains an address Ca which specifies the element in the cell nucleus (i.e., the arithmetic logic unit, accumulating multiplier, etc.) to be connected to the result bus C. The twelfth field contains a register input address Ra, which determines whether the register cells of the register block rf are to be written in via the Q- or R-input.

It will be understood that the embodiment described herein is merely exemplary and that a person skilled in the art may make many variations and modifications without departing from the spirit and scope of the invention. All such modifications are intended to be included within the scope of the invention as defined in the appended claims.

What is claimed is:

1. A wavefront array processor having a plurality of cells, said cells interconnected by a network for enabling a transfer of data over said network to and from adjacent cells, wherein each cell can receive data, process data and transmit data, each one of said cells comprising:

handshaking means for exchanging handshaking signals with and adjacent cell, wherein said handshaking signals include a first handshake signal, which indicates that said cell is ready to transmit data to said adjacent cell, a second handshake signal which indicates that said cell is not ready to receive transmitted data from said adjacent cell, and wherein said cell transmits said data with said first handshake signal, but only when said adjacent cell is not sending said second handshake signal to said cell, transmitting means, coupled to said handshaking means for transmitting said data over said network to said adjacent cell, and receiving means, including buffer means, coupled to said handshaking means for receiving and buffering said data transmitted over said network from said adjacent cell, said receiving means providing a first sink status signal being indicative that said buffer means is not full thereby causing said second handshake signal to be suppressed, wherein said handshaking means operates to enable transmission of data to said receiving means during an absence of said second handshake signal and a second sink status signal determined by buffered data which indicates that said buffer means is empty;

data processing means coupled to said transmitting means and said receiving means, for accessing and processing said transmitted data received by said receiving means, and providing said transmitting means with data, said data processing means providing a source status signal to said transmitting means indicative of whether said data processing means has data to be transmitted or said receiving means has data to be transmitted to said adjacent cell, and where said first handshake signal is responsive to said source status signal;

a first blocking means coupled to said receiving means for blocking said receiving means from receiving said transmitted data from an adjacent cell, when said second sink status signal is not present; and a second blocking means coupled to said transmitting means for blocking the transmission of data between said data processing means and said transmitting means and for blocking the transmission of data between said transmitting means and said adjacent cell, when said adjacent cell sends said second handshake signal to said cell.

2. An array processor according to claim 1, wherein said receiving means includes a FIFO buffer and means for providing said first signal when said FIFO buffer is empty.

3. An array processor according to claim 1, wherein said handshake means of said cell sends said second handshake signal to said adjacent cell after receiving said first handshake signal from said adjacent cell, whereby said cell acknowledges that it has received said transmitted data, and wherein said adjacent cell cancels said first handshake signal and said transmitted data after receiving said second handshake signal from said cell.

4. An array processor according to claim 1, wherein said transmitting means includes a latch having an input adapted to receive said data from said data processing means and an output adapted to place said data on said network.

5. An array processor according to claim 1, further comprising external bus means and bus switch means for coupling said external bus means to cells located at edges of said array processor.

6. An array processor according to claim 1, wherein said plurality of cells are arranged in a two-dimensional mesh array.

7. An array processor according to claim 6, wherein said communication means is a handshake port, and wherein each said cell includes at least four handshake ports corresponding to four adjacent cells.

8. An array processor according to claim 7, wherein said data processing means includes:
  a ring bus having first and second rings connected to an input of said transmitting means and an output of said receiving means of each one of said handshake ports, and a third ring connected to an input of said transmitting means of each one of said handshake ports;
  a first source bus connected to said first ring;
  a second source bus connected to said second ring;
  a result bus connected to said third ring; and
  an arithmetic logic unit having a first input connected to said first source bus, a second input connected to said second source bus, and an output connected to said result bus.

9. An array processor according to claim 8, wherein said arithmetic logic unit includes means for performing shifting and rotation functions, and means for providing status symbols, said status symbols including an overflow signal, a sign signal, a zero signal and a carry signal, and wherein said output of said arithmetic logic unit is coupled to said second input of said arithmetic logic unit, whereby said arithmetic logic unit can perform concatenated operations.

10. An array processor according to claim 8, wherein said data processing means further includes accumulating multiplier means, which includes:
  a parallel multiplier using pipelining and having a first input connected to said first source bus and a second input connected to said second source bus;
  an adder having a first input coupled to an output of said parallel multiplier, said adder providing an overflow signal and a sign signal; and
  an accumulator having an input coupled to an output of said adder, a first output, which is coupled to a second input of said adder, and output means, connected between said accumulator and said result bus, for outputting said data from said accumulator to said result bus.

11. An array processor according to claim 10, wherein said result bus has 12 data lines, wherein said accumulator includes at least 24 registers coupled to said output of said adder and wherein said accumulator output means includes a first output line for outputting data from the first 12 registers, a second output line for outputting data from the next 12 registers, and a third output for outputting data from the middle 12 registers.

12. An array processor according to claim 10, wherein said accumulating multiplier has a propagation delay greater than the propagation delay of said arithmetic logic unit, and wherein said data processing means of each said cell further includes a delay stage, coupled to said output of said arithmetic logic unit, for delaying said output of said arithmetic logic unit such that said propagation delays of said arithmetic logic unit and accumulating multiplier are equal.

13. An array processor according to claim 12, wherein said handshake port further includes delay means, connected between said input of said receiving means and said first and second rings, respectively, for delaying a signal for a period of time approximately equal to the propagation delay of said accumulating multiplier.

14. An array processor according to claim 8, wherein said data processing means further includes a register block having a first output connected to said first source bus, a second output connected to said second source bus, a first input connected to said result bus and a second input connected to said first and second source buses, whereby said register block can transfer data to said second input from either said first output or said second output.

15. An array processor according to claim 8, wherein said data processing means further includes a first latch connected between said first source bus and said first ring, a second latch connected between said second source bus and said second ring, and a third latch connected between said result bus and said third ring.

16. An array processor according to claim 8, further comprising a program bus and means for downloading at least one control program to said plurality of cells via said program bus, wherein said data processing means further includes
  memory means, responsive to said program bus, for storing one of said at least one control programs; and
  controlling means, responsive to said status signals and to said memory means, for controlling said data processing means in accordance with said control program stored in said memory means.

17. An array processor according to claim 16, wherein said control program stored in said memory means of each cell includes a plurality of instructions, and wherein said controlling means fetches said instructions from said memory means and execute said fetched instruction.

18. An array processor according to claim 17, wherein each said instructions contains a field for:
  an opcode;
  a first source address specifying a data source to be loaded onto said first ring;
  a second source address specifying a data source to be loaded onto said second ring;
  a third source address specifying an element of said data processing means to be loaded onto said third bus; and
  first, second, third and fourth destination addresses, which correspond to four handshake ports, each said address indicating a ring of said ring bus, if any, from which said handshake ports shall be loaded.

19. An array processor according to claim 18, wherein said instruction further contains fields for a condition code, which specifies a state of one of said status signals, and a branch address to which said control unit jumps if said state of said status signal matches said state specified by said condition code.

20. An array processor according to claim 18, wherein said memory means has an output connected to said result bus, wherein said instruction further contains a field for a constant and wherein said constant is loaded onto said result bus by said output of said memory means.

21. An array processor according to claim 1, wherein said array processor is a multiple-instruction, multiple-data-stream processor.

22. An array processor according to claim 1, wherein said plurality of cells are integrated on a single chip using VLSI technology.

23. An array processor according to claim 1, wherein each one of said cells has a clock input, and wherein said clock inputs of said cells are interconnected by an H-branch network.

24. A multiple-instruction, multiple-data-stream wavefront array processor having a plurality of cells, wherein each cell can receive data, process data and transmit data, said cells arranged in a mesh and interconnected by a network, comprising external bus means for communicating with a host; bus switch means for coupling said external bus means to cells located at one or more edges of said array processor; and each one of said cells comprising:

at least four handshake ports, each said handshake port functioning to transfer data over said network to and from an adjacent cell, and including handshaking means coupled to said handshake port for exchanging handshaking signals with an adjacent cell, wherein said handshaking signals include a first handshake signal, which indicates that said cell is ready to transmit data to said adjacent cell, a second handshake signal which indicates that said cell is not ready to receive transmitted data from said adjacent cell, and wherein said cell transmits said data with said first handshake signal, but only when said adjacent cell is not sending said second handshake signal to said cell, transmitting means, coupled to said handshaking means for transmitting said data over said network to said adjacent cell, and a FIFO buffer coupled to said handshaking means for receiving and buffering said data transmitted over said network from said adjacent cell, said FIFO buffer providing a sink status signal being indicative that said FIFO buffer is not full thereby causing said second handshake signal to be suppressed, wherein said handshaking means operates to enable the transmission of data to said FIFO buffer during an absence of said second handshake signal; and said FIFO buffer providing a second sink status signal determined by said buffered data being indicative that said FIFO buffer is empty;

data processing means coupled to said transmitting means and said FIFO buffer, for accessing and processing said transmitted data received by said receiving means, and providing said transmitting means with data, said data processing means providing a source status signal to said transmitting means indicative of whether said data processing means has data to be transmitted or said receiving means has data to be transmitted to said adjacent cell, and where said first handshake signal is responsive to said source status signal;

a ring bus having first and second rings connected to an input of said transmitting means and an output of said FIFO buffer of each one of said handshake ports, and a third ring connected to an input of said transmitting means of each one of said handshake ports;

a first source bus connected to said first ring;

a second source bus connected to said second ring;

a result bus connected to said third ring; and an arithmetic logic unit having a first input connected to said first source bus, a second input connected to said second source bus, and an output connected to said result bus; and a first blocking means coupled to said FIFO buffer and responsive to said second sink status signal, for blocking said FIFO buffer from receiving said transmitted data from said adjacent cell, when said second status signal is not present; and a second blocking means coupled to said transmitting means and responsive to said second handshake signal, for blocking said data processing means from providing data to said transmitting means, for blocking said receiving means from providing data to said transmitting means and for blocking said transmitting means from transmitting data to said adjacent cell, when said adjacent cell sends said second handshake signal to said cell.

* * * * *